United States Patent
McCleary et al.

(10) Patent No.: US 10,249,980 B2
(45) Date of Patent: Apr. 2, 2019

(54) DEFORMABLE TRANSLATABLE SEAT FOR REDUCING STRESS ON CERAMIC PENETRATORS

(71) Applicant: Teledyne Instruments, Inc., Thousand Oaks, CA (US)

(72) Inventors: Alan D. McCleary, St. Augustine, FL (US); Christopher M. Eliassen, Orlando, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

(21) Appl. No.: 15/383,323

(22) Filed: Dec. 19, 2016

(65) Prior Publication Data

US 2018/0175541 A1    Jun. 21, 2018

(51) Int. Cl.
| | |
|---|---|
| *H01R 13/52* | (2006.01) |
| *H01R 13/523* | (2006.01) |
| *H02G 3/22* | (2006.01) |
| *H02G 9/02* | (2006.01) |
| *H02G 15/007* | (2006.01) |

(52) U.S. Cl.
CPC ......... *H01R 13/521* (2013.01); *H01R 13/523* (2013.01); *H02G 3/22* (2013.01); *H02G 9/02* (2013.01); *H02G 15/007* (2013.01)

(58) Field of Classification Search
CPC .............................. H01R 13/523; H01R 13/521
USPC ...................... 439/733.1, 271, 281, 519, 587; 174/152 R
See application file for complete search history.

(56) References Cited

U.S. PATENT DOCUMENTS

| | | | |
|---|---|---|---|
| 1,456,110 A | 5/1923 | MacKay | |
| 2,503,194 A | 4/1950 | Cipriani | |
| 2,942,135 A | 6/1960 | McLaren | |
| 3,812,455 A * | 5/1974 | Pearson | ................. G01V 1/201 367/154 |
| 4,037,891 A | 7/1977 | Walters | |
| 4,071,663 A | 1/1978 | Bredbenner | |
| 4,500,980 A * | 2/1985 | Copeland | ............... H02G 15/14 367/154 |
| 4,618,351 A * | 10/1986 | Esper | .................... B03C 3/0175 174/139 |
| 5,103,900 A | 4/1992 | McLeod | |

(Continued)

FOREIGN PATENT DOCUMENTS

WO    WO 2015/107358 A2    7/2015

*Primary Examiner* — Abdullah A Riyami
*Assistant Examiner* — Nelson R. Burgos-Guntin
(74) *Attorney, Agent, or Firm* — Duncan Galloway Egan Greenwald, PLLC; Kevin T. Duncan

(57) ABSTRACT

The present invention provides a system for providing a stress reduction apparatus for a ceramic electrical penetrator or pin in a subsea environment. More specifically, the present invention provides a deformable translatable seat in an annular pocket that prevents the transfer of shear forces from a shell or fixture to a ceramic electrical penetrator or pin. The present invention provides a relatively soft metal seat that conforms to the profile of the shoulder of a mating electrical penetrator or pin and deforms to reduce or eliminate concentrated bearing stresses. The deformable translatable seat may also shift and deform within the annular pocket to relieve shearing stresses exerted on the electrical penetrator or pin by the shell or fixture.

20 Claims, 3 Drawing Sheets

(56) References Cited

U.S. PATENT DOCUMENTS

| | | | |
|---|---|---|---|
| 5,387,119 A * | 2/1995 | Wood | H01R 13/523 439/281 |
| 5,980,317 A * | 11/1999 | McNeel | H01R 13/502 439/281 |
| 6,067,395 A | 5/2000 | Cairns et al. | |
| 6,321,021 B1 | 11/2001 | Cairns et al. | |
| 6,482,036 B1 * | 11/2002 | Broussard | H01R 13/523 439/606 |
| 6,526,212 B1 | 2/2003 | Mishriky et al. | |
| 6,633,720 B1 | 10/2003 | Xu | |
| 7,447,390 B2 | 11/2008 | Dunphy et al. | |
| H002230 H * | 8/2009 | Nechitailo | 102/489 |
| 7,690,936 B1 * | 4/2010 | Snekkevik | H01R 13/523 439/201 |
| 8,287,295 B2 | 10/2012 | Sivik et al. | |
| 8,422,835 B2 | 4/2013 | Dunphy et al. | |
| 8,634,690 B2 * | 1/2014 | Landaas | G02B 6/4428 29/428 |
| 8,968,018 B2 | 3/2015 | Sivik et al. | |
| 9,423,564 B2 | 8/2016 | Dunphy et al. | |
| 2005/0164534 A1 * | 7/2005 | Li | H01R 13/2407 439/108 |
| 2008/0274636 A1 * | 11/2008 | Marklove | H01R 13/521 439/271 |
| 2009/0080836 A1 * | 3/2009 | Cairns | G02B 6/3816 385/56 |
| 2010/0035452 A1 * | 2/2010 | Mudge, III | H01R 13/533 439/271 |
| 2010/0248516 A1 * | 9/2010 | Hui | H01R 13/52 439/271 |
| 2011/0006518 A1 | 1/2011 | Poulton | |
| 2011/0230089 A1 * | 9/2011 | Amidon | H01R 9/0524 439/578 |
| 2012/0003856 A1 * | 1/2012 | Yamaguchi | H01R 13/5202 439/271 |
| 2012/0244748 A1 * | 9/2012 | Purdy | H01R 9/0524 439/578 |
| 2013/0309896 A1 * | 11/2013 | Spencer | H01R 13/58 439/345 |
| 2014/0024250 A1 * | 1/2014 | Spencer | H01R 13/523 439/521 |
| 2014/0073176 A1 * | 3/2014 | Plant | H01R 13/523 439/519 |
| 2014/0109699 A1 | 4/2014 | Janitch | |
| 2014/0141658 A1 * | 5/2014 | Bazenas | F16F 1/045 439/730 |
| 2014/0187142 A1 | 7/2014 | Liu et al. | |
| 2014/0360729 A1 | 12/2014 | Benestad | |
| 2015/0093921 A1 * | 4/2015 | Lewin | H01R 13/523 439/39 |
| 2015/0104964 A1 * | 4/2015 | McIntosh | H01R 13/521 439/271 |
| 2015/0207265 A1 * | 7/2015 | Plant | H01R 13/523 439/521 |
| 2016/0006169 A1 * | 1/2016 | Relion | G01V 1/202 439/292 |
| 2016/0126641 A1 * | 5/2016 | Lewin | H01R 4/20 439/86 |
| 2016/0126662 A1 * | 5/2016 | Plant | H01R 13/523 439/587 |
| 2016/0156126 A1 * | 6/2016 | Eliassen | H01R 13/5219 439/272 |

* cited by examiner

DEFORMABLE TRANSLATABLE SEAT FOR REDUCING STRESS ON CERAMIC PENETRATORS

FIELD OF THE INVENTION

The present invention generally relates to an electrical power feedthrough. More specifically, the present invention relates to a method and apparatus for reducing stress or strain on a ceramic electrical penetrator in an electrical power feedthrough system in a subsea environment.

BACKGROUND

In subsea production, electrically operated apparatuses below sea level are typically supplied by power from sea- or land-based host facilities. The power is provided from the external sources to the subsea devices via cable conductors to submerged process control equipment, pumps and compressors, transformers, motors, and other electrically operated equipment. As these components are disposed subsea and are typically enclosed and protected by water-proof pressure vessels, power is provided by means of a cable termination and connector, which may be an electrical penetrator, designed to penetrate and provide power through a bulkhead.

In existing penetrator assemblies, the conductor pin of the penetrator is embedded in an insulator body, which may be seated in a penetrator housing and is sealed against the penetrator housing by means of O-rings, or other types of seals. In submerged applications the electrical penetrator must be protected from the ingress of water. Integrity of the seal is critical to operation of the subsea equipment and it is important to avoid use of materials prone to degradation and failure over time due to harsh conditions. At operational water depths down to and below 1,000 meters the penetrator and subsea device are both subjected to immense external pressure. This pressure requires a penetrator structure that is adapted to operate despite high external pressures and differential pressures over seals.

In one application an electrical penetrator may be used to power subsea electric submersible pump (ESP) equipment and the like which pump hydrocarbons in oil well installations, and also in other applications such as high pressure downhole electrical penetrations and other penetrations to provide power to various types of subsea equipment. The penetrator extends through the wall or bulkhead of the vessel in which the equipment is located, and is normally connected to power cables at one end for connecting the equipment to an external power source. In an ESP application, the connection or penetrator cannot be isolated from the pumping pressure for practical reasons. This creates an extreme environment for the connector or penetrator in terms of pressure, temperature, and high voltage. The penetrator must transfer power to the motor as well as maintaining a pressure barrier for both internal pressure created by the ESP and external pressure caused by the depth in seawater. The temperatures are increased due to fluid temperatures as well as resistive heating of the electrical elements. These penetrators must also be able to resist sustained intense heat from a hydrocarbon fire and maintain both electrical connectivity and seal integrity in high temperature and material stress situations.

In a typical electrical penetrator or feed-through component a set of seals and/or O-rings are used to prevent the ingress of external fluids into the subsea device and to prevent internal fluids from escaping. The seals must be qualified to show that they meet certain standards such as those set by the American Petroleum Institute ("API") for subsea oil and gas applications. Such standards may include API 6A and API 17D. Seals used with electrical penetrators may also be qualified to prove that they pass extended pressure and heat cycles, and "make or break" testing cycles where alternating pressures are applied to the seals. These qualification measures are expensive and time consuming. It may be difficult to find or design a seal suitable for a particular electrical penetrator. Existing systems, apparatuses, and methods for electrical penetrators and penetrator assemblies are known and are described in at least U.S. Pat. No. 8,287,295, entitled ELECTRICAL PENETRATOR ASSEMBLY (Sivik et al.), and U.S. Pat. No. 8,968,018, entitled ELECTRICAL PENETRATOR ASSEMBLY (Sivik et al.), each of which are incorporated by reference herein in their entirety.

Furthermore, seals such as those described above may need to be replaced or may fail. Problems also exist with the installation and replacement of these seals and O-rings. The seals or O-rings may become damaged, dislodged, or may shift in the seal housings. Any of these issues may cause a leak or seal failure, resulting in damaged equipment, production downtime, and lengthy and expensive repair and replacement procedures. To overcome these problems electrical penetrators and sealing mechanisms not requiring O-ring seals were developed and are described in U.S. patent application Ser. No. 14/980,106, entitled RADIALLY AND AXIALLY-COMPRESSED CERAMIC SEALING METHOD AND APPARATUS, by Spahi et al., filed Dec. 28, 2015, which is incorporated by reference herein in its entirety. However, the system and method disclosed therein may susceptible to strain issues and the ceramic penetrator may crack or otherwise fail from strain on the penetrator from the shell or housing.

For example, the ceramic penetrator described therein may be subjected to concentrated bearing stresses or shearing stresses that may cause the ceramic components of the ceramic penetrator to crack or fracture. These stresses may be present when the ceramic penetrator is installed in a bulkhead penetrator assembly, when connectors (e.g., plugs or sockets) are connected to one end of the ceramic penetrator, when subsea currents or other subsea forces exert pressure on the subsea equipment, or when other subsea assemblies attached or otherwise connected to the bulkhead penetrator assembly in which the ceramic penetrator is disposed are moved or otherwise shift. Cracks or fractures or other damage to the ceramic penetrator at high pressures may compromise seal integrity can may lead to equipment failure or other more catastrophic failures.

What is needed is a stress reduction apparatus and related method of providing strain relief or for reducing stress on a ceramic electrical penetrator in a shell or housing.

SUMMARY OF THE INVENTION

The present invention provides a system for providing a seal for an electrical penetrator in a subsea environment. More specifically, the present invention provides a deformable translatable seat in an oversized annular pocket that prevents the transfer of shear forces from a shell or fixture to a ceramic electrical penetrator or pin. The present invention provides a relatively soft metal annular seat that mates with and conforms to the profile of the shoulder of a mating electrical penetrator or pin and deforms to reduce or eliminate concentrated bearing stresses. The deformable translatable seat may also shift and deform within the annular pocket to relieve shearing stresses exerted on the electrical penetrator or pin by the shell or fixture.

The deformable translatable seat comprises a relatively soft metal seat which is adapted to conform to the profile of the shoulder of the mating pin. As pressure is applied to the pin, the seat is adapted to deform in a manner that reduces and preferably eliminates concentrated bearing stresses. Additionally, the annular pocket in which the seat rests is preferably larger than the seat itself. The larger pocket allows the seat to shift laterally in order to relieve potential shearing stresses caused by misalignment of shell features.

The known configurations of the load-bearing shoulder and seat for a typical high power pin requires extremely tight tolerances especially in configurations that have multiple pins. Under operational loads, the shell half containing the seat can move relative to the mating shell half and exert enough shear force to fracture the pin(s).

The ceramic pin rests in a deformable metal seat which is disposed in a slightly annular pocket providing for lateral movement. The deformable translatable seat and annular pocket reduce and eliminate excessive transfer of shear forces from the shells to the pin. Furthermore, the deformability of the seat reduces contact stress.

In a first embodiment the present invention provides a stress reduction apparatus for use in bulkhead penetrator assemblies in subsea environments, the apparatus comprising: a central element having a first end and second end and having a substantially cylindrical body comprising an enlarged central portion, the enlarged central portion being ceramic and having first and second shoulders that gradually transitions down respectively to the first and second ends; a first fixture having an opening adapted to receive the first end of the central element and a metallic seal surface comprising an annular pocket; a second fixture having an opening adapted to receive the second end of the central element and a metallic seal surface geometrically configured to abut the second shoulder of the central element; and a deformable translatable seat disposed within the pocket of the first fixture and adjacent to the first shoulder of the central element, the deformable translatable seat comprising a deformable material geometrically configured in cooperation with adjoining surfaces of the first fixture and the first shoulder to abut the first shoulder of the central element.

The stress reduction apparatus of the above embodiment may further comprise wherein the deformable translatable seat is adapted to deform within the pocket when under pressure. The annular pocket may be adapted to enable the deformable translatable seat to deform within the pocket. The annular pocket may be larger than the deformable translatable seat when the deformable translatable seat is in a non-deformed condition. The deformable material of the deformable translatable seat is a deformable metal having a hardness relatively less than the first fixture. The deformable metal may be nickel. The deformable translatable seat may be adapted to relieve concentrating bearing stress and shearing stress on the central element. The central element may be a ceramic penetrator. The deformable translatable seat may comprise a ring with a substantially triangular cross-section, the ring may further comprise: an exterior surface adapted to fit within the pocket; and an interior surface having a profile adapted to geometrically match an exterior surface of the first shoulder of the central element.

In a second embodiment the present invention provides a stress reduction apparatus for use in reducing concentric bearing and shearing stresses on ceramic bulkhead penetrators in subsea environments, the apparatus comprising: a deformable translatable annular seat disposed within an annular pocket formed in a bulkhead penetrator assembly, the deformable translatable seat comprising a deformable metal; and wherein the deformable translatable seat may be disposed about a ceramic penetrator and may be adapted to deform under stress to prevent damage to the ceramic penetrator.

The stress reduction apparatus of the second embodiment may further comprise a deformable translatable seat which may comprise a ring with a substantially triangular cross-section, the ring may further comprise: an exterior surface adapted to fit within the annular pocket; and an interior surface having a profile adapted to geometrically match an exterior surface of a first shoulder of a central element of the ceramic penetrator. The deformable metal of the deformable translatable seat may be a metal having a hardness relatively less than the metal forming the annular pocket. The deformable translatable seat may be adapted to relieve concentrating bearing stress and shearing stress on the ceramic penetrator. The annular pocket may be larger than the deformable translatable seat when the deformable translatable seat may be in a non-deformed condition.

In a third embodiment the present invention provides a method for reducing stress for ceramic penetrators in bulkhead penetrator assemblies in subsea environments, the method comprising: placing a ring-shaped deformable translatable seat in an annular pocket formed in a first support component of the bulkhead penetrator assembly, the deformable translatable seat comprising a deformable metal; positioning a ceramic penetrator through an opening of the first support component defined by the annular pocket and the ring-shaped deformable translatable seat disposed therein wherein a shoulder of the ceramic penetrator abuts an interior surface of the ring-shaped deformable translatable seat; and securing the ceramic penetrator in the bulkhead penetrator assembly.

The method of the third embodiment may further comprise wherein the ring-shaped deformable translatable seat may comprise a substantially triangular cross-section, and wherein the ring-shaped deformable translatable seat may further comprise: an exterior surface adapted to matingly fit within the annular pocket; and an interior surface having a profile adapted to geometrically match an exterior surface of the shoulder of the ceramic penetrator. The securing may comprise subjecting the ceramic penetrator to a compressive force. The deformable metal of the deformable translatable seat may be a metal having a hardness relatively less than the annular pocket. The deformable translatable seat may be adapted to relieve concentrating bearing stress and shearing stress on the ceramic penetrator. The annular pocket may be larger than the deformable translatable seat when the deformable translatable seat may be in a non-deformed condition.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
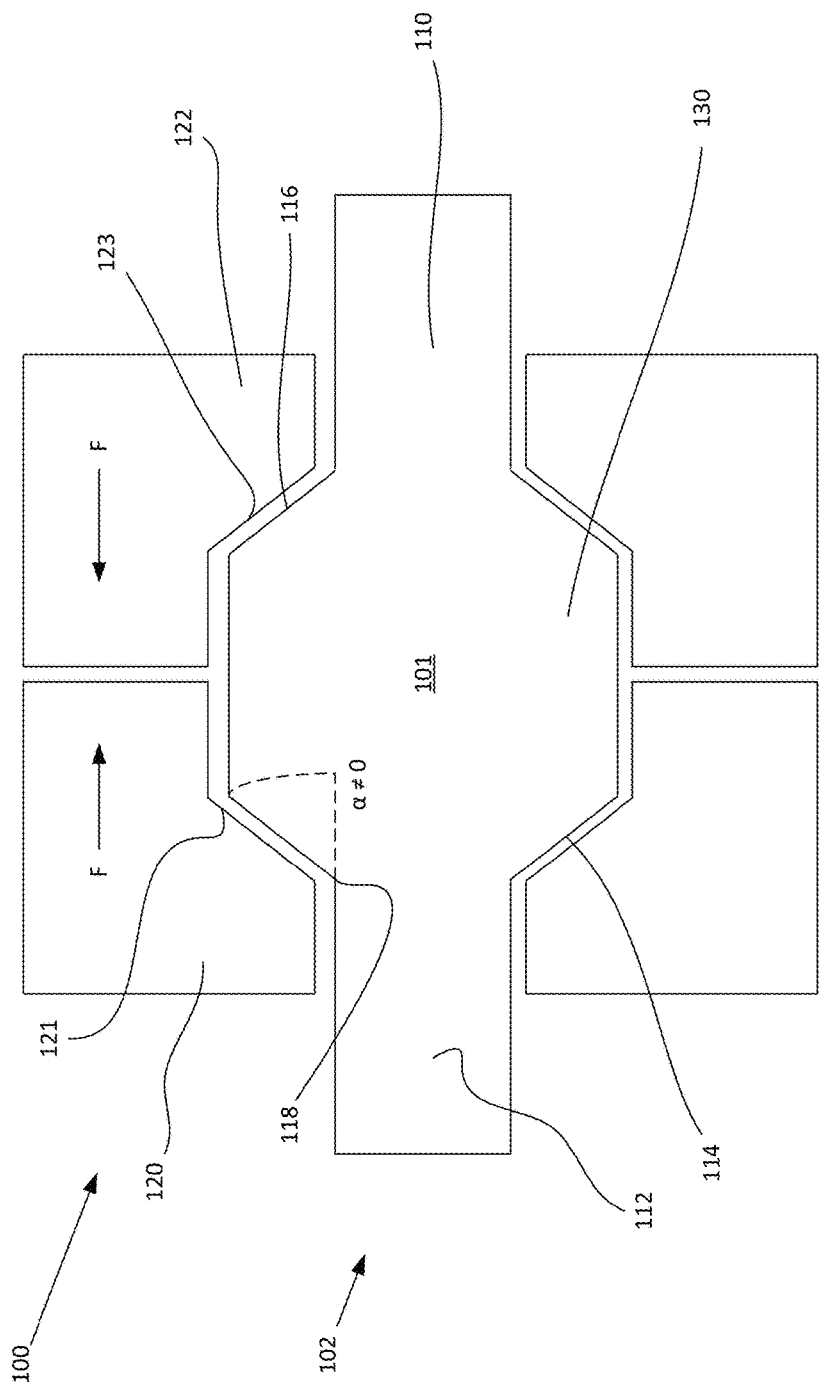
FIG. 1 provides a schematic cross-section of a Prior Art sealing apparatus wherein the shoulder angle on the ceramic core is less than 90 degrees.

With reference to FIG. 1, a schematic cross-section of a Prior Art sealing apparatus 100 is provided. The Prior Art sealing apparatus 100 comprises a first fixture 120 and a second fixture 122 providing compressing forces F on the ceramic core 102. The ceramic core 102 has a first end 112, a second end 110, and a raised or enlarged central portion 130. The ceramic core 102 has body 101 that is substantially cylindrical and is adapted to be disposed within the interior of first fixture 120 and second fixture 122. The raised or enlarged central portion 130 has a first shoulder 114 and a second shoulder 116 that transitions from the shoulders to respective ends of the ceramic core 102. The first shoulder 114 is adapted to be in physical contact with the interior 121 of the first fixture 120 and the second shoulder 116 is adapted to be in physical contact with the interior 123 of the second fixture 122. When assembled, the first 120 and second shoulder 122 provide a set of compressing forces F on the shoulders 114 and 116 of the raised or enlarged central portion 130 of the ceramic core 102 to aid in forming a sealed condition.

The forces F may comprise both radial and axial compressive forces based on the degree, a, of the angle 118. The degree a of the angle 118 must be greater than 0, and the shoulder angle 118 on the ceramic core 102 is less than 90 degrees. The geometry of the annular shoulders 114 and 116 of the raised or enlarged central portion 130 and of the interiors 121 and 123 of the respective first 120 and second 122 fixtures with the compressive force F creates a hermetic seal about the ceramic core 102 at the abutment of the shoulders 114 and 116 of the raised or enlarged central portion 130 and of the interiors 121 and 123 of the respective first 120 and second 122 fixtures. The heretic seal is maintained through the constant application of a compressive force on the ceramic core 102 by the first 120 and second 122 fixtures.

Figure 2:
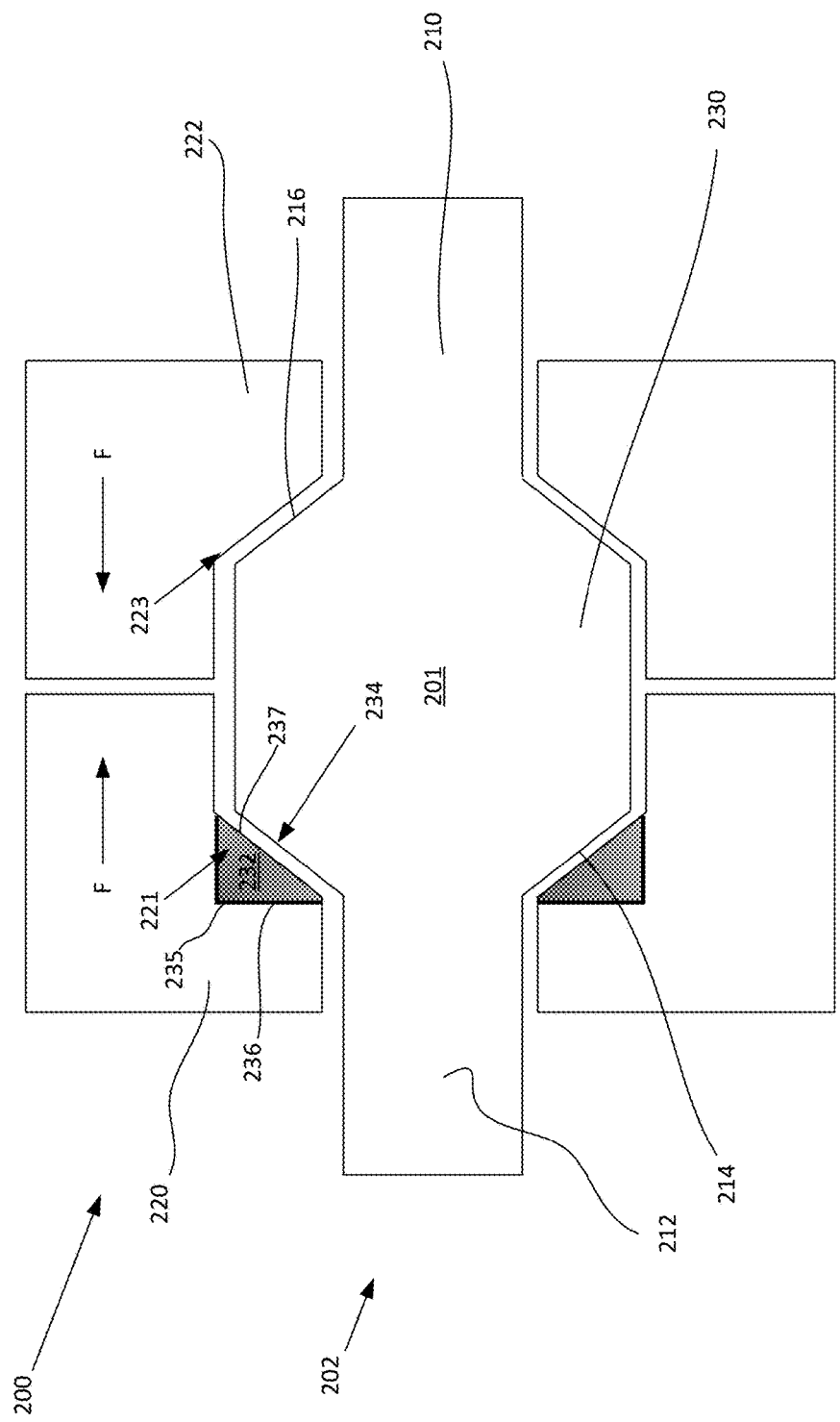
FIG. 2 provides a schematic cross section of a stress reduction apparatus having a deformable, translatable seat in accordance with a first embodiment of the present invention.

With reference to FIG. 2, a schematic cross section of a penetrator assembly 200 comprising a stress reduction assembly 234 in accordance with a first embodiment of the present invention is provided. The penetrator assembly 200 comprises a first fixture 220 and a second fixture 222 providing compressing forces F on the central element which is the ceramic penetrator 202. The ceramic penetrator 202 has a first end 212, a second end 210, and a enlarged central portion 230. The ceramic penetrator 202 has body 201 that is substantially cylindrical and is adapted to be disposed within the interior of first fixture 220 and second fixture 222. The enlarged central portion 230 has first annular shoulder 214 and second annular shoulder 216. The shoulders 214/216 are transitions from enlarged central portion 230 reduced down, respectively, to ends 210 and 212. The first shoulder 214 is adapted to be in physical contact with the first fixture shoulder area 221 of the first fixture 220 and the second shoulder 216 is adapted to be in physical contact with the second fixture shoulder area 223 of the second fixture 222. The first fixture shoulder area 221 and second fixture shoulder area 223 provide a set of compressing forces F on the shoulders 214 and 216 of the enlarged central portion 230 of the ceramic penetrator 202 to help form a sealed assembly.

The penetrator assembly 200 comprises the stress reduction assembly 234 which reduces or relieves concentrated bearing stress and/or shear stress applied to the ceramic penetrator 202. The stress reduction assembly 234 comprises a deformable translatable seat 232 disposed within a pocket 236. The seat 232 is deformable in that the seat 232 is comprised of a material that may deform under stress and is translatable in that the seat 232 may move within the pocket 236. The seat is preferably made at least in part of metal and more preferably a relatively softer metal when compared with fixtures 220 and 222. The seat 232 may be comprised of any material that is relatively less hard than the material that comprises the first fixture 220. For example, if the material that comprises the first fixture 220 is a steel or steel alloy, the seat 232 may be comprised of a relatively softer metal. In one embodiment the seat 232 may be comprised of nickel or a suitable nickel alloy.

The pocket 236 is shown as an annular recess or space formed in one of the fixtures for receiving the seat 232 and is preferably oversized with respect to the seat 232. The pocket 236 is adapted to provide for the deformation or translation of the seat 232 within the pocket 236 to accommodate for stresses applied to the ceramic penetrator 202. For example, if a shear stress is applied across the ceramic penetrator 202, the seat 232 may move and/or deform to enable the ceramic penetrator 202 to move slightly within the penetrator assembly 200 to prevent the ceramic of the ceramic penetrator from cracking, fracturing, or breaking. The seat 232 will typically have a smaller diameter and may have a thicker cross-section when it is in a non-deformed condition. If the seat 232 is subjected to excessive forces it may deform and change shape and be forced into empty space in the pocket 236 to enable the ceramic penetrator 202 to move within the penetrator assembly 200 without being damaged.

If the ceramic penetrator 202 allowed to move or shift within the penetrator assembly 200, the ceramic penetrator 202 may fail causing a catastrophic seal or containment failure in the penetrator assembly 202. In a subsea application, this may mean that external seawater, at a much higher pressure relative to the interior of any vessel, shell, or housing in which the penetrator assembly 200 is implemented, may rapidly ingress into the vessel, shell, or housing. This rapid ingress of seawater will force out any fluids in the vessel, shell, or housing and may cause electrical shorts, equipment failure, or other damage.

The stress reduction assembly 234 substantially reduces the likelihood of seal integrity failure by enabling the ceramic penetrator 202 to shift or move within the penetrator assembly 200 without fracturing or breaking. In one embodiment, the seat 232 is a ring or annulus with a substantially triangular cross-section. The exterior sides 235 of the seat 232 are geometrically configured to fit within the annular recess or pocket 236 and the interior side 237 of the seat 232 faces and is geometrically configured to fit the profile or contour of the first shoulder 214. For example, if the first shoulder 214 has a gradually sloping or a curved profile, the profile of the interior side 237 of the seat 232 would have a corresponding profile shape such that it would be geometrically configured to matingly match and fit the profile of the first shoulder 214. The stress reduction assembly 234 may also provide relief to the ceramic penetrator 202 when excessive compressive forces are applied to the ceramic penetrator 202.

Figure 3:
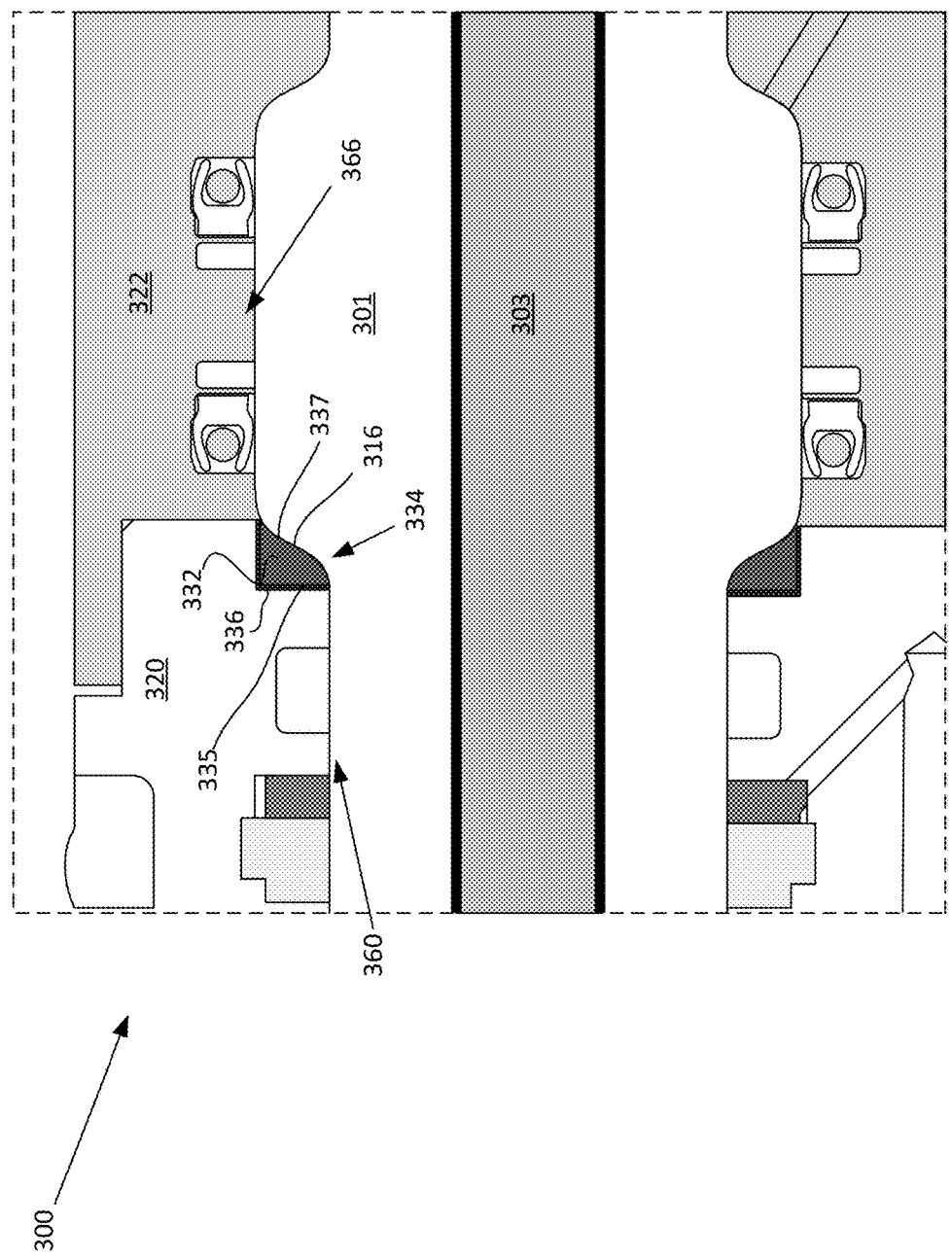
FIG. 3 provides a partial cross-section of a bulkhead penetrator assembly with stress reduction apparatus and a ceramic penetrator pin comprising a ceramic core in accordance with the first embodiment of the present invention.

With reference now to FIG. 3, a partial cross-section of a bulkhead penetrator assembly 300 with stress reduction apparatus 334 and a ceramic penetrator pin 301 comprising a ceramic material and having a conductor 303 in accordance with the first embodiment of the present invention is provided. The bulkhead penetrator assembly 300 comprises a first fixture 320, second fixture 322, ceramic penetrator pin 301, core sealing assemblies 366, fixture sealing assemblies 360, and stress reduction apparatus 334. The core sealing assemblies 366 and fixture sealing assemblies 360 provide additional seals in addition to the seal formed by the geometry of the ceramic penetrator pin 301. The particular geometries shown are exemplary of the invention and not limiting.

The stress reduction apparatus 334 comprises a ring-shaped, deformable translatable seat 332 received in an oversized annular pocket 336. The deformable translatable seat 332 is substantially ring-shaped and has a substantially triangular cross-section. The exterior surfaces 335 of the deformable translatable seat 332 face the annular pocket 336 and the interior surface 337 of the deformable translatable seat 332 faces and abuts the core shoulder 316 of the ceramic penetrator pin 301. The profile of the interior surface 337 of the deformable translatable seat 332 matches geometrically and conforms to the profile of the core shoulder 316 to provide a mating abutment.

In assembly of the bulkhead penetrator assembly 300, the seals of the core sealing assemblies 366 and fixture sealing assemblies 360 are first installed in the second fixture 322 and first fixture 320 respectively. The deformable translatable seat 332 is positioned and disposed in the annular pocket 336 and then the ceramic penetrator pin 301 is positioned in the first fixture 320. The first fixture 320 and second fixture 322 are then joined and a compressive force is applied to the ceramic penetrator pin 301 to form a hermetic seal about the pin 301 and to secure and firmly position the ceramic penetrator pin 301 in the bulkhead penetrator assembly 300. The seat 332 provides for strain and stress relief on the ceramic penetrator pin 301 in assembly and in operation and deforms to relieve concentrated bearing stresses, shear stresses, and other stresses that may act on and damage the ceramic penetrator pin 301 as described above with respect to the seat 232 shown in FIG. 2.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A bulkhead penetrator assembly and stress reduction apparatus for use in subsea environments, the penetrator assembly comprising:
   a central element having a first end and second end and having a substantially cylindrical body comprising an enlarged central portion, the enlarged central portion being ceramic and having first and second shoulders that gradually transition down respectively to the first and second ends;
   a first fixture having an opening adapted to receive the first end of the central element and a metallic seal surface comprising an annular pocket;
   a second fixture having an opening adapted to receive the second end of the central element and a metallic seal surface geometrically configured to abut the second shoulder of the central element;
   a deformable translatable seat disposed within the pocket of the first fixture and adjacent to the first shoulder of the central element, the deformable translatable seat comprising a deformable material geometrically configured in cooperation with adjoining surfaces of the first fixture and the first shoulder to abut the first shoulder of the central element;
   wherein the annular pocket forms a recessed space in the metallic seal surface of the first fixture for receiving the deformable translatable seat; and
   wherein the annular pocket in which the deformable translatable seat is disposed is relatively larger than the deformable translatable seat and is adapted to provide for a change in size of the deformable translatable seat by deformation of the deformable translatable seat, and is further adapted to provide for translation of the deformable translatable seat by movement of the deformable translatable seat within the relatively larger annular pocket.

2. The assembly of claim 1 wherein the deformable translatable seat is adapted to deform within the pocket when under pressure.

3. The assembly of claim 1 wherein the annular pocket is adapted to enable the deformable translatable seat to deform within the annular pocket.

4. The assembly of claim 1 wherein the annular pocket is larger than the deformable translatable seat when the deformable translatable seat is in a non-deformed condition.

5. The assembly of claim 1 wherein the deformable material of the deformable translatable seat is a deformable metal having a hardness relatively less than the first fixture.

6. The assembly of claim 5 wherein the deformable metal is nickel.

7. The assembly of claim 1 wherein the deformable translatable seat is adapted to relieve concentrating bearing stress and shearing stress on the central element.

8. The assembly of claim 1 wherein the central element is a ceramic penetrator.

9. The assembly of claim 1 wherein the deformable translatable seat comprises a ring with a substantially triangular cross-section, the ring comprising:
- an exterior surface adapted to fit within the pocket; and
- an interior surface having a profile adapted to geometrically match an exterior surface of the first shoulder of the central element.

10. An apparatus for use in reducing concentric bearing and shearing stresses on ceramic bulkhead penetrators in subsea environments, the apparatus comprising:
- a deformable translatable annular seat disposed within an annular pocket formed in a bulkhead penetrator assembly, the annular pocket forming a recessed space in a metallic seal surface of the bulkhead penetrator assembly for receiving the deformable translatable annular seat, the annular pocket being relatively larger than the deformable translatable annular seat and adapted to provide for a change in size of the deformable translatable annular seat by deformation of the deformable translatable annular seat and provide for translation of the deformable translatable annular seat by movement of the deformable translatable annular seat within the relatively larger annular pocket, the deformable translatable seat comprising a deformable metal; and
- wherein the deformable translatable seat is disposed about a ceramic penetrator and is adapted to deform under stress to prevent damage to the ceramic penetrator.

11. The apparatus of claim 10 wherein the deformable translatable seat comprises a ring with a substantially triangular cross-section, the ring comprising:
- an exterior surface adapted to fit within the annular pocket; and
- an interior surface having a profile adapted to geometrically match an exterior surface of a first shoulder of a central element of the ceramic penetrator.

12. The apparatus of claim 10 wherein the deformable metal of the deformable translatable seat is a metal having a hardness relatively less than the metal forming the annular pocket.

13. The apparatus of claim 10 wherein the deformable translatable seat is adapted to relieve concentrating bearing stress and shearing stress on the ceramic penetrator.

14. The apparatus of claim 10 wherein the annular pocket is larger than the deformable translatable seat when the deformable translatable seat is in a non-deformed condition.

15. A method for reducing stress for ceramic penetrators in bulkhead penetrator assemblies in subsea environments, the method comprising:
- placing a ring-shaped deformable translatable seat in an annular pocket formed in a support component of the bulkhead penetrator assembly, the annular pocket forming a recessed space in a sealing surface of the support component for receiving the ring-shaped deformable translatable seat, the annular pocket being relatively larger than the ring-shaped deformable translatable seat and adapted to provide for a change in size of the ring-shaped deformable translatable seat by deformation of the ring-shaped deformable translatable seat and provide for translation of the ring-shaped deformable translatable seat by movement of the ring-shaped deformable translatable seat within the relatively larger annular pocket, the ring-shaped deformable translatable seat comprising a deformable metal;
- positioning a ceramic penetrator through an opening of the support component defined by the annular pocket and the ring-shaped deformable translatable seat disposed therein wherein a shoulder of the ceramic penetrator abuts an interior surface of the ring-shaped deformable translatable seat; and
- securing the ceramic penetrator in the bulkhead penetrator assembly.

16. The method for stress reduction of claim 15 wherein the ring-shaped deformable translatable seat comprises a substantially triangular cross-section, and wherein the ring-shaped deformable translatable seat further comprises:
- an exterior surface adapted to matingly fit within the annular pocket; and
- an interior surface having a profile adapted to geometrically match an exterior surface of the shoulder of the ceramic penetrator.

17. The method for stress reduction of claim 15 wherein the securing comprises subjecting the ceramic penetrator to a compressive force.

18. The method for stress reduction of claim 15 wherein the deformable metal of the deformable translatable seat is a metal having a hardness relatively less than the annular pocket.

19. The method for stress reduction of claim 15 wherein the deformable translatable seat is adapted to relieve concentrating bearing stress and shearing stress on the ceramic penetrator.

20. The method for stress reduction of claim 15 wherein the annular pocket is larger than the deformable translatable seat when the deformable translatable seat is in a non-deformed condition.

* * * * *